United States Patent [19]

Villa-Garcia et al.

[11] Patent Number: 5,010,049

[45] Date of Patent: Apr. 23, 1991

[54] MODIFIED MOLYBDENUM SULFIDE HYDRODESULFURIZATION/HYDRODENITROGENATION CATALYSTS

[75] Inventors: Maria A. Villa-Garcia, Oviedo, Spain; Johannes Schwank, Ann Arbor, Mich.

[73] Assignee: The Regents of the University of Michigan, Ann Arbor, Mich.

[21] Appl. No.: 328,338

[22] Filed: Mar. 24, 1989

[51] Int. Cl.$^5$ .................... B01J 27/04; B01J 27/043; B01J 27/047
[52] U.S. Cl. ................... 502/60; 502/182; 502/183; 502/184; 502/185; 502/219; 502/220
[58] Field of Search .............. 502/219, 220, 60, 182, 502/183, 184, 185

[56] References Cited

U.S. PATENT DOCUMENTS

| | | | |
|---|---|---|---|
| 3,000,816 | 9/1961 | Vernon et al. | 502/220 X |
| 4,261,741 | 4/1981 | Terrat | 75/134 F |
| 4,460,553 | 7/1984 | Deschamps et al. | 423/219 |
| 4,560,470 | 12/1985 | McCarty et al. | 502/220 X |
| 4,581,125 | 4/1986 | Stiefel et al. | 208/108 |
| 4,632,747 | 12/1986 | Ho et al. | 208/18 |
| 4,650,563 | 3/1987 | Jacobson et al. | 208/108 |
| 4,663,023 | 5/1987 | McCandish et al. | 208/112 |
| 4,666,878 | 5/1987 | Jacobson et al. | 502/221 |
| 4,705,619 | 11/1987 | McCandish et al. | 208/112 |
| 4,755,496 | 7/1988 | Ho et al. | 502/165 |
| 4,839,326 | 6/1989 | Halbert et al. | 502/219 X |

OTHER PUBLICATIONS

*Applied Catalysis*, 13, (1984) 89–100, "Electrophoretic Characterization of Unsupported Sulfide Hydrodesulfurization Catalysts".
*Bull. Soc. Chim. Belg.*, vol. 90/No. 12/1981, "On the Role of Promoter Atoms in Unsupported Hydrodesulfurization Catalyst: Influence of Preparation Method".
*Journal of Catalysis*, 77, 564–566 (1982), "The Origin of Catalytic Synergy in Unsupported Co—Mo HDS Catalysts".
*Bull. Soc. Chim. Belg.*, vol. 90/No. 12/1981, "Structure and HDS Activity of Co—Mo Catalysts: A Comparison of Alumnia and Carbon Supports".
*Journal of Catalysis*, 68, 453–463 (1981), "On the Catalytic Significance of a Co—Mo—S Phase in Co—Mo-/Al$_2$O$_3$ Hydrodesulfurization Catalysts: Combined in . . .".
*Journal of Catalysis* 68, 433–452 (1981), "In Situ Mossbauer Emission Spectroscopy Studies of Unsupported and Supported Sulfided Co—Mo . . .".
*Catal. Rev.—Sci. Eng.*, 26(3 & 4), 395–420 (1984), "Importance of Co—Mo—S Type Structures in Hydrodesulfurization".
*Catal. Rev.—Sci. Eng.*, 26(3 & 4), 361–393 (1984), "Fundamental Studies of Transition Metal Sulfide Hydrodesulfurization Catalysts".
*Polyhedron*, vol. 5, No. $\frac{1}{2}$., pp. 195–198 (1986), "Effect of the Activation Conditions on the Structure and Catalytic Activity of A Co—Mo . . .".

*Primary Examiner*—W. J. Shine
*Attorney, Agent, or Firm*—Oblon, Spivak, McClelland, Maier & Neustadt

[57] ABSTRACT

Hydrodesulfurization/hydrodenitrogenation catalysts and a process for making these is disclosed.

The catalysts have (i) overall stoichiometries of $M_{2x}A_{1-x}S_2$, where $0.001 \leq x \leq 0.5$, M is Co, Fe, Ni, Cu, Zn, Mn or Ru, and A is Mo or W, or (ii) overall stoichiometries of $AS_{2-y}$, where $0.01 \leq y \leq 1.00$.

To obtain the $M_{2x}A_{1-x}S_2$ catalysts, elemental material M, elemental material A and elemental sulfur are combined in an amount of x moles of M and (1-x)/2 moles of A per mole of S and the mixture is then heated, in the absence of oxygen, to a temperature of from 200° C. to 800° C. for 1 hour to 1 week. To obtain the $AS_{2-y}$ catalysts, elemental material A and elemental sulfur are mixed in an amount of (2-y) moles of sulfur per mole of A, and a parallel process protocol is followed.

24 Claims, 8 Drawing Sheets

FIG. 4A
FIG. 4B
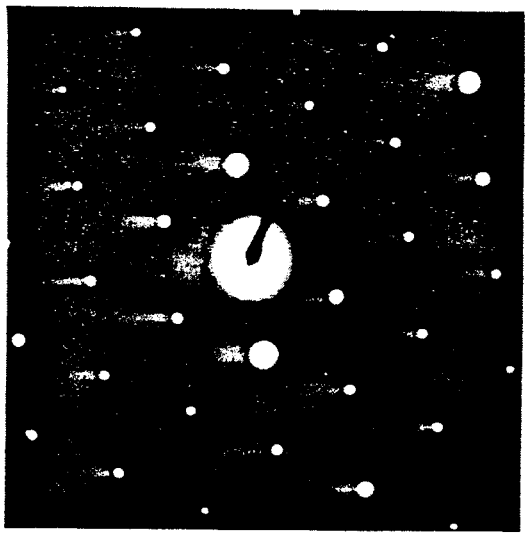
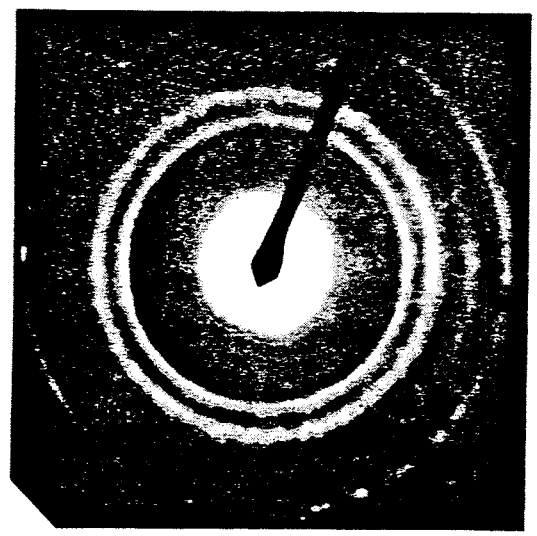
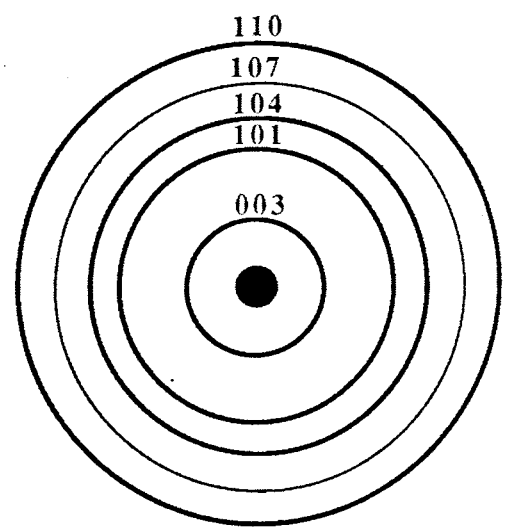
FIG. 4D
FIG. 4C

MODIFIED MOLYBDENUM SULFIDE HYDRODESULFURIZATION/HYDRODENITROGENATION CATALYSTS

BACKGROUND OF THE INVENTION

1. Field of the Invention

The invention relates to catalysts used in hydrodesulfurization and/or hydrodenitrogenation.

2. Discussion of the Background

The petroleum industry is increasingly utilizing coal, tar sands, heavy crudes and resids as sources for feedstocks. Feedstocks derived from these heavy materials contain greater quantities of sulfur and nitrogen than feedstocks derived from more conventional crude oils, and are consequently considered as being dirty feeds.

These feeds require extensive upgrading to obtain usable products therefrom. Such upgrading or refining is generally accomplished by hydrotreating processes which are well known in the petroleum industry and which include hydrodesulfurization and hydrodenitrogenation.

These processes require treating with hydrogen ($H_2$) of various hydrocarbon fractions, or whole heavy feeds, or feedstocks, in the presence of hydrotreating catalysts to effect the removal of unwanted components, or compounds, or their conversion to innocuous or less undesirable compounds. In the treatment of catalytic cracking feedstocks, the cracking quality of the feedstock is improved by the hydrotreating. Carbon yield is reduced, and gasoline yield is generally increased.

Hydrotreating may be applied to many different feedstocks, e.g., solvents, light, middle or heavy distillate feeds and residual feeds, or fuel. In hydrotreating relatively light feeds, the feeds are treated with hydrogen, often to improve odor, color, stability, combustion characteristics, and the like. Unsaturated hydrocarbons are hydrogenated and saturated, while sulfur and nitrogen are removed.

In the hydrodesulfurization of heavier feedstocks, or residua, the sulfur compounds are hydrotreated and cracked. Carbon-sulfur bonds are broken, and most of the sulfur is converted to hydrogen sulfide ($H_2S$) which is removed as a gaseous species from the process.

Hydrodenitrogenation, to some extent occurs simultaneously with hydrodesulfurization reactions. In the hydrodenitrogenation of heavier feedstocks, or residua, the nitrogen compounds are hydrogenated and cracked. Carbon-nitrogen bonds are broken, and the nitrogen is removed from the process in the form of ammonia ($NH_3$).

In the hydrosulfurization of relatively heavy feedstocks, emphasis is on the removal of sulfur from the feedstock. In the hydrodenitrogenation of relatively heavy feedstocks emphasis is on the removal of nitrogen from the feedstock.

Hydrotreating is thus one of the major processes in the oil industry. Today, the value of hydrotreating catalysts sold in the United States alone exceeds $50 million/year, and more than 20 million pounds of catalysts per year are consumed.

Hydrodesulfurization is used for petroleum or coal liquids feedstocks of every conceivable molecular-weight range. The actual extent to which sulfur removal is effected will depend upon many factors, primarily the original sulfur content of the feedstock, the temperature at which treatment is effected, and the activity of the catalyst employed in the hydrodesulfurization reaction.

Typical hydrotreating catalysts are prepared by impregnation of support materials such as $Al_2O_3$ with molybdenum or tungsten oxides which are promoted with cobalt or nickel. To achieve satisfactory activity, about 3.5% by weight of metallic cobalt and 15% molybdenum oxide are required. Most of the cobalt is rendered nearly inactive due to the formation of solid solutions with the $Al_2O_3$ support.

Catalysts most commonly used for these hydrotreating reactions include materials such as cobalt molybdate on alumina, nickel on alumina, cobalt molybdate promoted with nickel, nickel tungstate, etc. Also, it is well known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons.

Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfides for producing sulfur-free hydrogen and carbon dioxide, where the molybdenum sulfide converts carbonyl sulfide to hydrogen sulfide. Molybdenum and tungsten sulfides have other uses as catalysts, including hydrogenation, methanation, water gas shift, etc. reactions.

More recently, it has been disclosed in U.S. Pat. Nos. 4,243,553, and 4,243,554 that molybdenum sulfide catalysts of relatively high surface area may be obtained by thermally decomposing selected thiomolybdate salts at temperatures ranging from 300° to 800° C. in the presence of essentially inert, oxygenfree atmospheres. Suitable atmospheres are disclosed as consisting of argon, a vacuum, nitrogen and hydrogen.

In U.S. Pat. No. 4,243,554 an ammonium thiomolybdate salt is decomposed at a rate in excess of 15° C. per minute, whereas in U.S. Pat. No. 4,243,553, a substituted ammonium thiomolybdate salt is thermally decomposed at a very slow heating rate of from about 0.5° to 2° C./min. The processes disclosed in these patents are claimed to produce molybdenum disulfide catalysts having superior properties for water gas shift and methanation reactions and for catalyzed hydrogenation or hydrotreating reactions.

U.S. Pat. No. 4,755,496, U.S. Pat. No. 4,698,145, U.S. Pat. No. 4,632,747, U.S. Pat. No. 4,666,878, U.S. Pat. No. 4,663,023, U.S. Pat. Nos. 4,650,563, and 4,705,619 disclose supported hydroprocessing catalysts prepared by heating a composite support material and one or more catalyst precursor salts under oxygen-free conditions and in the presence of sulfur at a temperature of at least about 200° C. The precursor salt or salts are of the general formula $(ML)(Mo_yW_{1-y}S_4)$ or $(ML)(Mo_yW_{1-y}O_4)$ wherein M comprises one or more promoter metals which include Mn, Fe, Co, Ni, Zn and mixtures thereof, y is any value ranging from 0 to 1, and L is one or more neutral, nitrogencontaining ligands at least one of which is a chelating, polydentate ligand. All of these catalysts require using the neutral, nitrogen-containing ligand in their preparation. The absence of the neutral, nitrogen-containing ligand is reported to significantly lower the catalysts' hydrodesulfurization (HDS) activity. These catalysts are also prepared in the presence of water which makes their characterization impossible.

U.S. Pat. No. 4,581,125 discloses that hydrocarbon feeds can be upgraded by contacting them, at elevated temperature and in the presence of hydrogen, with a self-promoted catalyst formed by heating one or more carbon-containing, bis(tetrathiometallate) catalyst precursor salts selected from the group consisting of $(NR_4)_2[M(WS_4)_2]$, $(NR_4)[M(MoS_4)_2]$ and mixtures thereof wherein R is one or more alkyl groups, aryl groups or mixtures thereof, wherein promoter metal M is covalently bound in the anion and is Ni, Co or Fe and wherein x is 2 if M is Ni and x is 3 if M is Co or Fe composite in a non-oxidizing atmosphere in the presence of sulfur, hydrogen, and a hydrocarbon to form the supported catalyst.

Engelhard has a catalyst, Sulfur Guard, that precedes reforming. The company maintains that because the catalyst operates in the gas phase, Sulfur Guard gets all the sulfur out. Competitive products, the company says, operate in the liquid phase (*Oil & Gas Journal*, June 24, 1987, 35).

Easy Active by Ketjen, a division of Akzo Chemie America, is a presulfided hydrotreating catalyst that spares refiners from sulfiding catalysts on the refinery site to achieve activation (*Chemical Week*, June 29, 1988, 54).

As of May, 1986, a Japanese catalyst manufacturer had demonstrated conversion of residual oil to lighter distillates, and low-sulfur and low-metal fuel oil. Idemitsu Kosan Co. Ltd. of Tokyo replaced a conventional resid catalyst with a new hydrodesulfurization catalyst (R-HYC 4) in a modified commercial hydrodesulfurization unit, producing 85-90% desulfurization. Benefits of the catalyst include: (1) High activity to crack heavy residues selectively to desired smaller hydrocarbons; (2) High hydrogenation activity in optimum combination with cracking activity; (3) High tolerance to contaminants in feedstocks such as metals and coke precursors; (4) High demetallization and deasphalting activity (*Oil & Gas Journal*, May 26, 1986, 51-52).

However there remains a strongly felt need for hydrodesulfurization/hydrodenitrogenation catalysts which are imbued with high activity, which are stable and which can be designed to control the product(s) produced from the catalytic process.

SUMMARY OF THE INVENTION

Accordingly, one object of this invention is to provide novel hydrodesulfurization/hydrodenitrogenation catalysts.

It is another object of this invention to provide novel hydrodesulfurization/hydrodenitrogenation catalysts possessing enhanced activity and requiring no presulfidation or reduction.

It is another object of this invention to provide novel hydrodesulfurization/hydrodenitrogenation catalysts which may be used without support or which may be combined with any support, which are very stable, and which can be designed to control product selectivity in terms of cracking and isomerization of the products.

It is another object of this invention to provide new and advantageous hydrodesulfurization and/or hydrodenitrogenation processes.

The present invention provides novel hydrodesulfurization/hydrodenitrogenation catalysts and a novel process for making these which satisfy all of the above objects of the invention and other objects which will become apparent from the description of the invention given hereinbelow.

The catalysts have overall stoichiometries of $M_{2x}A_{1-x}S_2$, where $0.001 \leq x \leq 0.5$, preferably $0.001 \leq x \leq 0.35$, and M is Co, Fe, Ni, Cu, Zn, Mn or Ru, and A is either Mo or W; or the catalysts have overall stoichiometries of $AS_{2-y}$, where A is either Mo or W, and $0.01 \leq y \leq 1.00$, preferably $0.01 \leq y \leq 0.10$.

To obtain the $M_{2x}A_{1-x}S_2$ catalysts, elemental material M (i.e., elemental cobalt, iron, nickel, copper, zinc, manganese or ruthenium), elemental material A (i.e. molybdenum or tungsten) and elemental sulfur are combined in an amount of x moles of M and (1-x)/2 moles of A per mole of S and the mixture is then heated, in the absence of oxygen, to a temperature of from 200° C. to 800° C., preferably 450° C. to 600° C., for 1 hour to 1 week, preferably 2 hours to 3 days.

To obtain the nonstoichiometric $MoS_{2-y}$ or $WS_{2-y}$ catalysts elemental molybdenum or tungsten and elemental sulfur are mixed in an amount of (2-y) moles of sulfur per mole of molybdenum or tungsten, and the mixture is also heated, in the absence of oxygen, to a temperature of from 200° C. to 800° C., preferably 450° C. to 600° C., for 1 hour to 1 week, preferably 2 hours to 3 days.

Nonstoichiometric $MoS_{2-y}$ or $WS_{2-y}$ catalysts can also be obtained by heating stoichiometric $MoS_2$ or $WS_2$ under a $H_2$ flow, to a temperature of from 200° C. to 800° C., during the period of time necessary to achieve the desired degree of nonstoichiometry.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying figures, wherein:

FIG. 4a provides photographs of selected area electron diffraction (SAED) pattern of $MoS_2$ showing well defined crystalline spots taken from a zone axis of [121];

FIG. 4b provides the SAED pattern from nonstoichiometric $MoS_{1.95}$ showing diffraction rings indicating its polycrystalline nature;

FIG. 4c illustrates the indexed ring pattern from $MoS_{1.95}$ and $Co_{0.05}Mo_{0.975}S_2$ (the (003), (101), and (104) reflections have the greatest intensities);

FIG. 4d provides an SAED pattern of $Co_{0.05}Mo_{0.975}S_2$ showing diffraction ring structure similar to those observed for the non-stoichiometric $MoS_{1.95}$ compound;

DETAILED DESCRIPTION OF THE PREFERRED EMBODIMENTS

Figure 1:
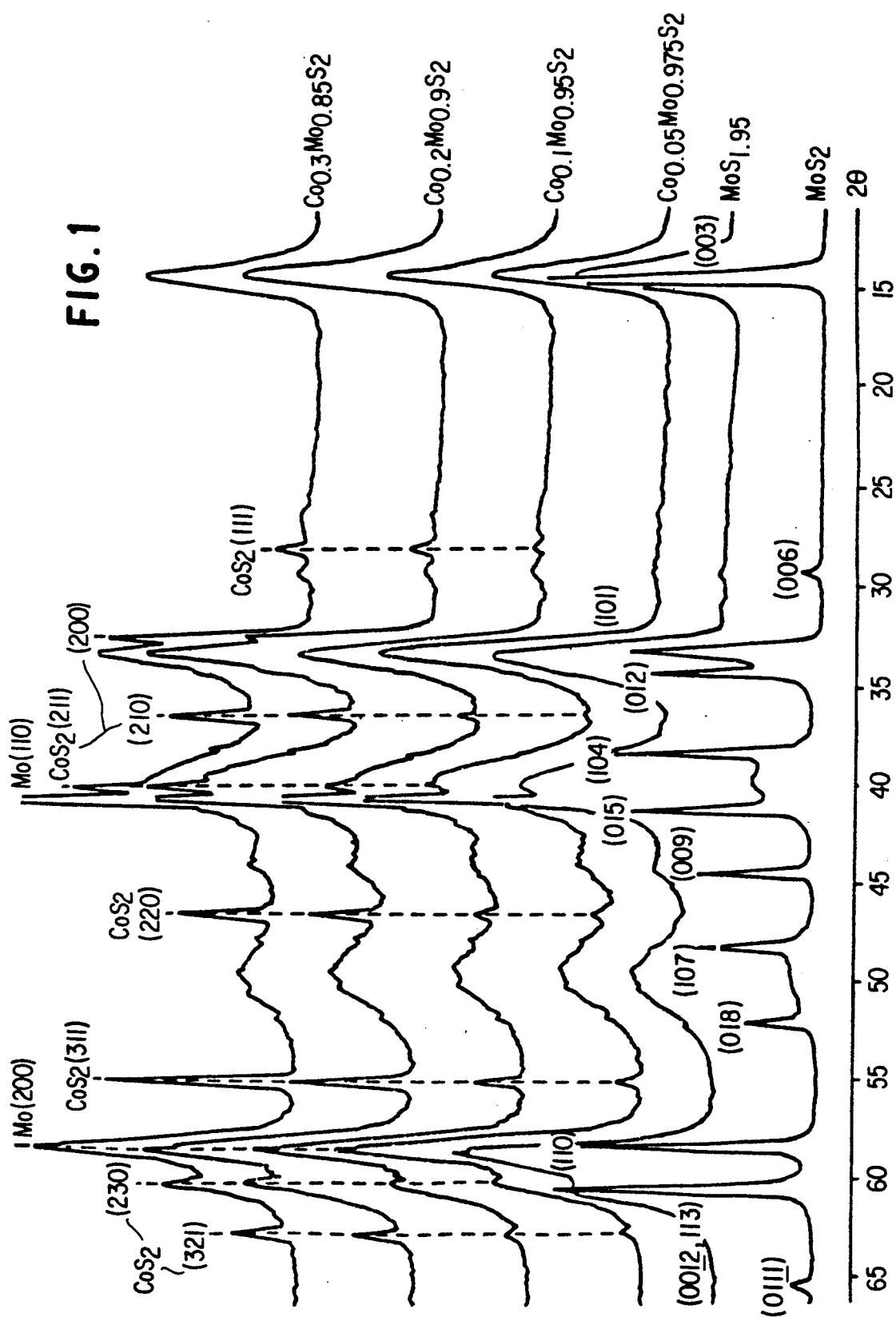
FIG. 1 provides X-ray diffraction patterns of freshly prepared catalysts $Co_{0.05}Mo_{0.975}S_2$, $Co_{0.1}Mo_{0.95}S_2$, $Co_{0.2}Mo_{0.9}S_2$, $Co_{0.3}Mo_{0.85}S_2$ (for comparison, the diffraction pattern of $MoS_2$ and $MoS_{1.95}$ is also shown)

The present invention thus relates to the preparation and use of novel materials capable of catalyzing the removal of sulfur and/or nitrogen from petroleum compounds and coal-derived liquids (hydrodesulfurization/hydrodenitrogenation). The preparation method is novel and yields catalytic materials not available before.

The present invention provides sixteen types of catalysts. These are: (1) $Co_{2x}Mo_{1-x}S_2$; (2) $Fe_{2x}Mo_{1-x}S_2$; (3) $Ni_{2x}Mo_{1-x}S_2$; (4) $Cu_{2x}Mo_{1-x}S_2$; (5) $Zn_{2x}Mo_{1-x}S_2$; (6) $Mn_{2x}Mo_{1-x}S_2$; (7) $Ru_{2x}Mo_{1-x}S_2$; and (8) $MoS_{2-y}$; (9) $Co_{2x}W_{1-x}S_2$; (10) $Fe_{2x}W_{1-x}S_2$; (11) $Ni_{2x}W_{1-x}S_2$; (12) $Cu_{2x}W_{1-x}S_2$; (13) $Zn_{2x}W_{1-x}S_2$; (14) $Mn_{2x}W_{1-x}S_2$; (15) $Ru_{2x}W_{1-x}S_2$; (16) $WS_{2-y}$. All of these catalysts show excellent hydrodesulfurization activity and hydrodenitrogenation activity, with $Ru_{2x}Mo_{1-x}S_2$ being particularly preferred for hydrodenitrogenation applications.

The catalysts are highly active for hydrodesulfurization and hydrodenitrogenation. They may be used either without support or they may be combined with any support used in the industry. These catalysts are imbued with a very high level of activity, a long life, and require no presulfidation or reduction prior to use. The catalysts are further thermally stable and resist deactivation.

The advantages of the present invention also include the fact that with the $Co_{2x}Mo_{1-x}S_2$ and $Co_{2x}W_{1-x}S_2$ catalysts cobalt is utilized more efficiently as compared to presently used catalyst where most of the cobalt is rendered inactive due to formation of solid solutions with the $Al_2O_3$ support. Furthermore, in the new $Fe_{2x}Mo_{1-x}S_2$ and $Fe_{2x}W_{1-x}S_2$ formulations of the present invention, iron which is much cheaper than cobalt, may be substituted for cobalt while maintaining the high catalytic activity formerly ascribed to the promotional effect of cobalt.

The preparation of the new catalysts is simple, requires only readily available and relatively inexpensive starting materials, and does not require major investments in equipment.

The $M_{2x}A_{1-x}S_2$ catalysts are prepared by combining elemental material M which may be advantageously used in the form of a powder with (i) elemental molybdenum and elemental sulfur or (ii) elemental tungsten and elemental sulfur, who both may also be advantageously used in the form of powders. These three components are combined in a relative amount of x moles of M and (1-x)/2 moles of A (i.e. molybdenum (Mo) or tungsten (W)) per mole of sulfur (S). The components are thoroughly mixed by grinding them together to insure intimate contact between the metal particles and sulfur.

The mixture of these elements is then placed into a reactor and heated. Since this temperature treatment has to be conducted in absence of oxygen, the reactor is either evacuated to at least 0.1 torr or filled with a noble gas (i.e. He, Ne, Ar, Kr, or Xe) or nitrogen ($N_2$) or any other inert gas before sealing it hermetically.

The reactor used should be inert towards the reactants. Suitable reactor materials include glass, quartz, stainless steel, or ceramic (e.g., $Al_2O_3$) The noble gases which may be used include helium, neon, argon, krypton or xenon.

The mixture of the elements is gradually heated to a temperature of from 200° C. to 800° C., preferably 450° C. to 600° C, most preferably 500° C. to 600° C., and held at this temperature for a period of time sufficient to let the solid state reaction(s) proceed to completion. This length of time is from 1 hour to 1 week, preferably 2 hours to 3 days. Once the reaction has reached completion, the material is removed from the reactor and, if necessary, ground into a fine powder which can, if so desired, be pressed into pellets of various shapes or used with a support material.

The $MoS_{2-y}$ and $WS_{2-y}$ catalysts are prepared by combining elemental molybdenum, which may preferably be in the form of a powder, with elemental sulfur, which may also advantageously be in the form of a powder. The molybdenum or tungsten and sulfur are mixed in an amount of (2-y) moles of sulfur per mole of molybdenum used.

The mixture is then subjected to the same treatment used to obtain the $M_{2x}A_{1-x}S_2$ catalysts. It is placed in a reactor and then heated, in the absence of oxygen to a temperature of from 200° C. to 800° C., preferably 450° C. to 600° C., most preferably 500° C. to 600° C. Since the temperature treatment has to be conducted in the absence of oxygen, the reactor is here also either evacuated to at least 0.1 torr or it is filled with a noble gas or nitrogen before sealing it hermetically. The reactor should likewise be inert towards the reaction, and can accordingly be made of glass, quartz, stainless steel or ceramic (e.g., $Al_2O_3$) as is the case with the $M_{2x}A_{1-x}S_2$ catalysts.

The mixture of the elements is gradually heated to 200° C. to 800° C., preferably 450° C. to 600° C., and held at this temperature for an extended period of time until the solid state reaction proceeds to completion. This length of time is from 1 hour to 1 week. Once the reaction has reached completion, the material is removed from the reactor and, if necessary, ground to a fine powder which can, if so desired, be pressed into pellets of various shapes.

The present catalysts may be used as obtained directly out of the reactor, or they can be ground into a fine powder if desired, or they can be added to a support material. Any desired ratio of catalyst to support can be used. The supports which may be used include any known supports used in this technology, for example, $Al_2O_3$, MgO, $SiO_2$, $TiO_2$, carbon, zeolites, diatomaceous earth, etc.

An advantage of the present catalysts is that they are added to the support after their formation. The catalyst powder is simply mixed with a support material at room temperature and the mixture is then pressed into a desired shape. Because the already formed catalyst is added to the support and the resulting mixture is then shaped (using known techniques) under mild conditions, the support does not react with or otherwise affect the catalytic activity of the catalyst. Thus the present catalysts can be used with a very wide range of supports.

The catalysts of the present invention are characterized by the fact that they are prepared by solid state reaction of elemental M, elemental A and elemental sulfur to make the $M_{2x}A_{1-x}S_2$ catalyst, and the $AS_{2-y}$ catalysts are also made by a solid state reaction; but in this latter case, a reaction involving only elemental molybdenum or tungsten and elemental sulfur.

An X-ray diffraction study of these materials shows a poorly crystallized, non-stoichiometric phase (a defect in the structure) occurring between $2\theta = 14°$ and $2\theta = 110°$. The presence of this phase coincides with a significantly enhanced hydrodesulfurization/ hydrodenitrogenation activity. This new phase which is found with catalyst compositions having a M/A atomic ratio of up 0.36 is shown for Co-Mo-S and Mo-S catalysts in FIGS. 1 and 3. In conventionally prepared catalysts, no such X-ray diffraction patterns characteristic for non-stoichiometric $MoS_{2-y}$ are observed.

The preparation method allows to systematically vary the composition and structure of the catalysts by varying the relative amounts of elements, the types of elements, and the length and severity of the thermal treatment. The preparation method can be extended to also include mixtures of the appropriate elements (taken from formulae $M_{2x}A_{1-x}S_2$ and $AS_{2-y}$) with metal sulfide powders.

Thus the present catalysts of formula $M_{2x}A_{1-x}S_2$ M can include a combination of two or more elements in any desirable proportion, taken from Fe, Ni, Cu, Zn, Mn, and Ru. And A can be Mo or W, or both Mo and W in any desired proportion. In the present catalysts of formula $AS_{2-y}$, A can be Mo or W, or both Mo and W, in any desired proportion.

It is important that in the preparation of the present catalysts a temperature not exceeding 800° C. be used. The inventors have discovered that if a higher temperature is used the material obtained possesses a different structure than is possessed by the catalysts of the present invention resulting in a loss of the advantageous hydrodesulfurization and hydrodenitrogenation activity possessed by the present catalyst.

U.S. Pat. No. 4,261,741 discloses an antifriction alloy containing 8.0 to 26.6% iron, 41.0 to 62.5% molybdenum and 23.3 to 40.5% sulfur. This alloy is reported to comprise a matrix of $Fe_xMo_{3-y}S_4$ where x and y are less than 1 (e.g., $FeMo_4S_5$) It may be obtained either by a chemical reaction between the iron, molybdenum and sulphur, or by fusion, or by vacuum deposition on a substrate, or by projecting mixtures of powders on to a substrate using a metallizing blow-torch and may be incorporated as a charge in a metal matrix or a polymer matrix or in a lubricant.

The materials disclosed by U.S. Pat. No. 4,261,741 are, however, prepared under conditions which are more dramatic than those used in the present process and which consequently produce defect-free alloys having a structure fundamentally different from the present catalysts and which do not display the outstanding hydrodesulfurization and hydrodenitrogenation activity of the catalysts of the present invention. Hydrodesulfurization and/or hydrodenitrogenation conditions vary considerably depending on the nature of the hydrocarbon being hydrogenated, the nature of the impurities or contaminants to be reacted or removed. In general the following are typical conditions for treating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290° to 550° C. or a residuum containing from about 10 percent to about 50 percent of a material boiling above 575° C.

| TYPICAL HYDROTREATING CONDITIONS | | | | |
|---|---|---|---|---|
| Feed | Temp., °C. | Pressure psig | Space Velocity V/V/Hr | Hydrogen Gas Rate SCF/B |
| Naphtha | 100–370 | 150–800 | 0.5–10 | 100–2000 |
| Diesel Fuel | 200–400 | 250–1500 | 0.5–6 | 500–6000 |
| Heavy Gas Oil | 260–430 | 250–2500 | 0.3–4 | 1000–6000 |
| Lube Oil | 200–450 | 100–3000 | 0.2–5 | 100–10,000 |
| Residuum | 340–450 | 1000–5000 | 0.1–2 | 2000–10,000 |

The catalysts of the present invention can be used in the hydrodesulfurization and/or hydrodenitrogenation of all of the above listed materials and they can also be used with coal. In coal applications, the coal may advantageously be ground and dispersed in an organic solvent. This coal suspension is then treated with a catalyst of the present invention to eliminate sulfur and/or nitrogen therefrom.

Other features of the invention will become apparent in the course of the following descriptions of exemplary embodiments which are given for illustration of the invention and are not intended to be limiting thereof.

SAMPLE PREPARATION

A series of samples with different Co/Mo ratios and a general stoichiometry of $Co_{2x}Mo_{1-x}S_2$, where x was between 0.025 and 0.3, were prepared by combining stoichiometric amounts of elemental cobalt and molybdenum powders with elemental sulfur, all three chemicals used being Fluka products (purum). The powders were thoroughly mixed by grinding them together to insure intimate contact between the components. The mixtures were placed into quartz tubes which were then evacuated to about 0.1 Pa and sealed. The tubes containing the mixtures were heated at a heating rate of 10K min$^{-1}$ from room temperature to 783K, held at this temperature for 24 hours and then rapidly quenched. Once the treatment was finished, the quartz tubes were opened. The contents of the tubes, generally dark grey or black materials, were removed and if necessary, ground into fine powders.

Based on the amounts of elemental powders used for the synthesis, the samples were named $Co_{0.05}Mo_{0.975}S_2$, $Co_{0.1}Mo_{0.95}S_2$, $Co_{0.2}Mo_{0.9}S_2$, $Co_{0.3}Mo_{0.85}S_2$, $Co_{0.5}Mo_{0.75}S_2$, and $Co_{0.6}Mo_{0.7}S_2$. Unpromoted $MoS_2$ and a non-stoichiometric sample, $MoS_{1.95}$, were also prepared from a mixture of metallic molybdenum and elemental sulfur following the procedure mentioned above.

A mechanical mixture of metallic Co and Mo powder with a Co/Mo atomic ratio of 0.222 was prepared at 673K for 24 hours in a flow of 2% $H_2S/H_2$. This sample was named '$Co_{0.2}Mo_{0.9} + H_2S$'.

CATALYST CHARACTERIZATION

To determine the crystalline phases present, all the catalysts were characterized by X-ray diffraction. A Phillips PW-1729 powder diffractometer equipped with a graphite crystal monochromator and Cu K $\alpha$ radiation was used. The surface areas of the freshly prepared samples were determined by using the BET method and a Monosorb Quantachrome Single Point instrument with nitrogen as adsorbate.

Electron microscopy was used to obtain selected area electron diffraction patterns of small regions of the catalysts and compliment the X-ray diffraction study. A JEOL 2000FX microscope operating at 200 kV was utilized for this purpose. Selected area diffraction patterns were obtained from regions 20 $\mu$m in diameter. Specimens were prepared by crushing the catalyst powder and then suspending it in isopropyl alcohol by sonicating the resulting mixture for 10 minutes. A few drops of this suspension were applied to a holey carbon support film on a copper grid.

X-ray photoelectron spectroscopy was used primarily as a purity check to insure that no trace amounts of transition metals were present in the $MoS_2$ and $MoS_{1.95}$ samples and to monitor the chemical shifts and peak shape of the Co $2p_1$ and $2p_{3/2}$ signals. A Perkin Elmer 5400 Series spectrometer was used with an Al anode operating at a pass energy of 71.5 eV. Spectra were recorded in the multiplex aquisition format in steps of 0.2 eV and the C 1s (284.6 eV) signal arising from airborne impurities present on all samples was used as an internal standard for binding energy calibration.

ACTIVITY MEASUREMENTS

The catalytic activity for the hydrodesulfurization of thiophene (Aldrich 99+%, Gold Label) was measured in a $\frac{1}{4}$ inch diameter stainless steel continuous flow reactor. After loading 0.35 g of powdered catalyst into the reactor, the temperature was raised to 673K under a flow of high-purity helium at 30 ml min$^{-1}$ and held at 673K for 30 min. Then, the temperature was lowered to the wanted reaction temperature, typically between 473 to 673K. The He flow was replaced by a gaseous feed stream containing 2.7% (by volume) of thiophene, the balance being hydrogen, at a flow rate of 10 ml min$^{-1}$ and a pressure of 98.6 kPa. The high-purity He and $H_2$ (<49 ppm impurities) were further purified by passage through a commercial oxygen trap (Matheson) and a bed of molecular sieves (5A) to remove moisture.

The effluent from the reactor was analyzed every half-hour by gas chromatography. Product separation and analysis were performed by using an n-octane/Porasil C column in a Varian 3700 gas chromatograph equipped with thermal conductivity detector. Peak areas were determined by a HewlettPackard 3390A integrator. After a given catalytic run the catalyst bed was flushed with He gas at 673K.

Figure 2:
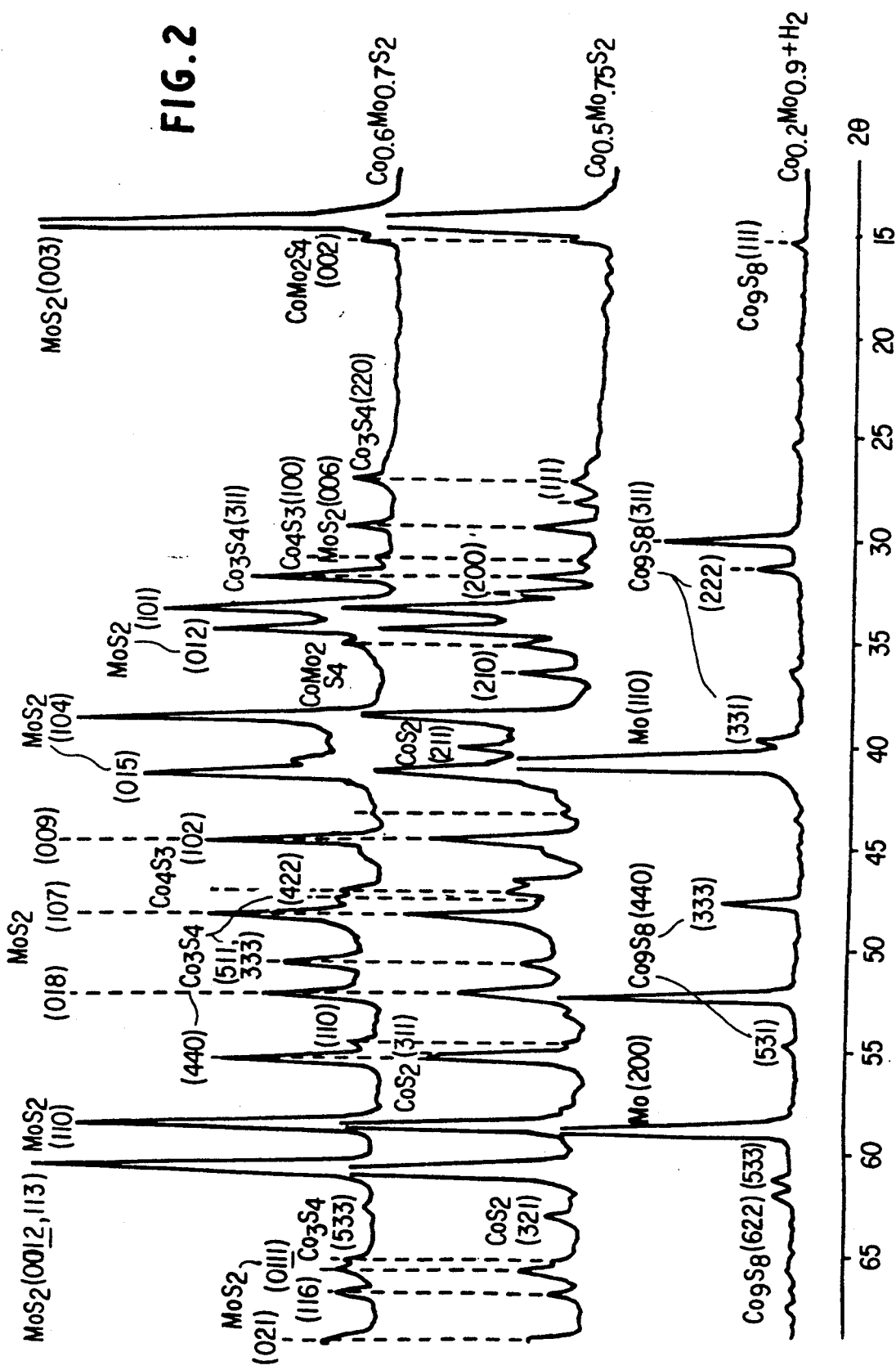
FIG. 2 provides X-ray diffraction patterns of freshly prepared catalysts $Co_{0.5}Mo_{0.75}S_2$, $Co_{0.6}Mo_{0.7}S_2$, and of the mechanical mixture '$Co_{0.2}Mo_{0.9}$ + $H_2S$'.
Figure 3:
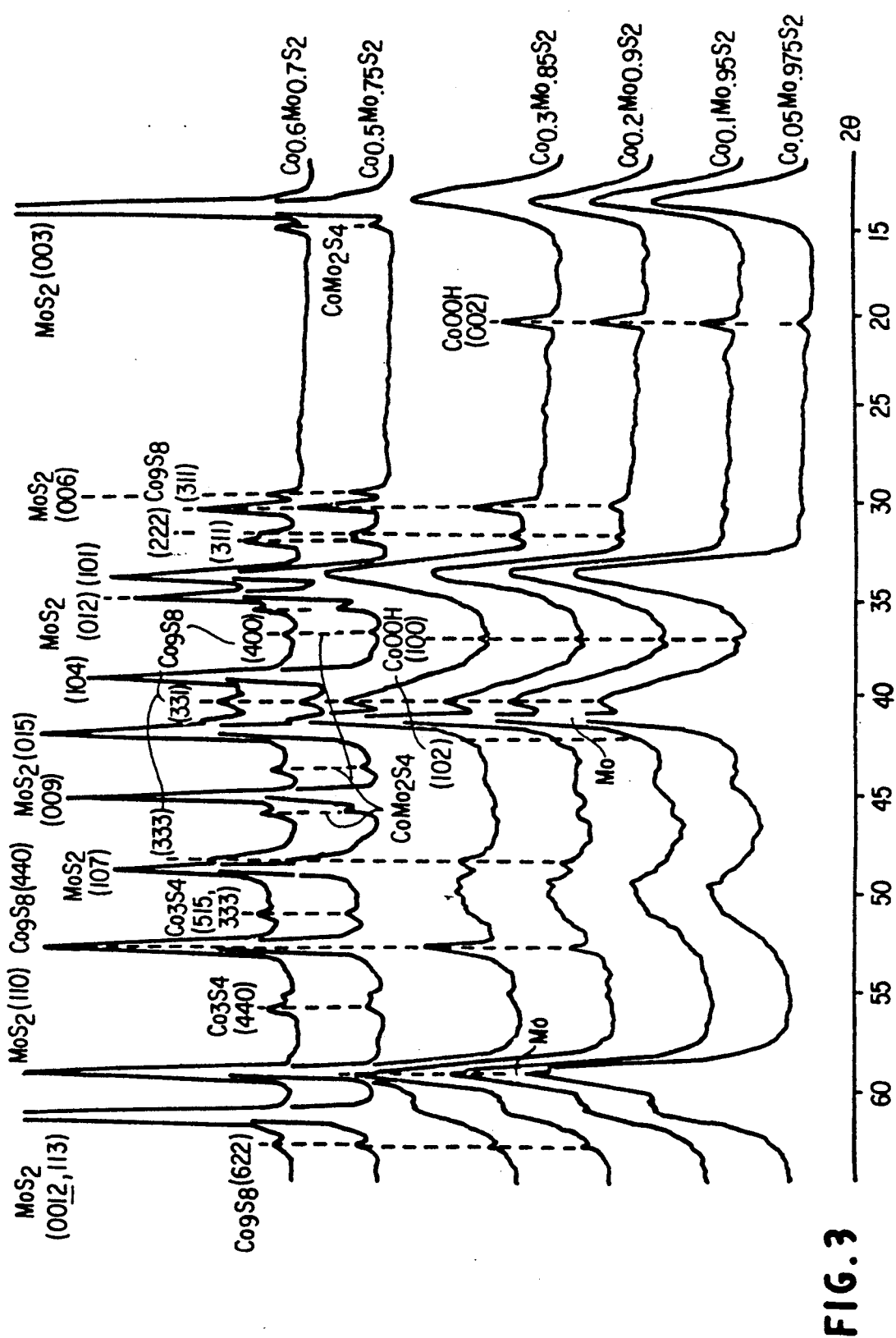
FIG. 3 provides X-ray diffraction patterns of catalysts $Co_{0.05}Mo_{0.975}S_2$, $Co_{0.1}Mo_{0.95}S_2$, $Co_{0.2}Mo_{0.9}S_2$, $Co_{0.3}Mo_{0.85}S_2$, $Co_{0.5}Mo_{0.75}S_2$, and $Co_{0.6}Mo_{0.7}S_2$, after prolonged exposure to typical hydrodesulfurization reaction conditions in a flow reactor.

FIGS. 1 and 2 show relevant parts of the X-ray powder diffraction patterns of the fresh catalysts before being used in the HDS reaction. Also, included are the diffractograms of the model $MoS_2$, $MoS_{1.95}$ and of sample '$Co_{0.2}Mo_{0.9}+H_2S$.'. The diffraction patterns of the used catalysts after 80 hours on stream on thiophene hydrodesulfurization are given in FIG. 3. Vertical lines mark the position of the diffraction maxima corresponding to the different phases. The powder X-ray diffraction patterns shown in FIGS. 1, 2 and 3 show that all the catalysts consist of a mixture of crystalline phases. In Table 1, the BET surface areas and the crystalline phases found in the fresh and used catalysts are summarized.

The samples $Co_{0.05}Mo_{0.975}S_2$, $Co_{0.1}Mo_{0.95}S_2$, $Co_{0.2}Mo_{0.9}S_2$, $Co_{0.3}Mo_{0.85}S_2$ (FIG. 1) exhibited very similar X-ray diffraction patterns. The patterns could be deconvulted into three distinct contributions of (1) unreacted metallic Mo, (2) $CoS_2$ with a cubic pyritetype structure, and (3) a poorly crystalline phase. $CoS_2$ showed a progressive growth with increasing Co loadings going from $Co_{0.05}Mo_{0.975}S_2$ to $Co_{0.3}Mo_{0.85}S_2$.

The poorly crystalline phase had broad diffraction lines whose maxima and line widths corresponded with those of the non-stoichiometric $MoS_{1.95}$ sample. Compared to stoichiometric $MoS_2$, there were differences in the intensities of reflections from certain crystallographic planes. The (003) diffraction line which was the most intense one in the model $MoS_2$ compound, lost intensity along with the (104) and the (0012, 113) lines while the (101) and (110) reflections became more intense than in $MoS_2$. This phenomenon is characteristic of all the processes involving changes in the composition of a material by isomorphic replacement, here replacement of Mo ions by Co ions. If $Mo^{4+}$ cations in the $MoS_2$ lattice are replaced by Co cations having lower charge, then the charge balance in the lattice may be maintained by creating anionic vacancies. The "substitutional solid solution" formed would be non-stoichiometric. Seeing that the creation of anionic sulfur vacancies in $MoS_2$ resulted in X-ray line broadening, it is tempting to attribute the line broadening in the cobalt containing samples also to the lack of stoichiometry.

It has been suggested in the literature that one of the major roles of cobalt is to increase the dispersion of very small particles of $MoS_2$ resulting in X-ray line broadening. However, in the case of the solid state samples investigated here, the X-ray line broadening cannot be attributed solely to crystallite size effects but is due to a lower degree of crystallinity of the nonstoichiometric phase. The evidence for this comes from selected area electron diffraction. $MoS_2$ showed very definite crystalline spot patterns from all regions of the sample investigated (FIG. 4a). The non-stoichiometric $MoS_{1.95}$ sample gave a ring structure showing predominantly (003), (101) and (104) reflections (FIG. 4b, c). The ring patterns indicate that the sample is polycrystalline throughout. Selected area electron diffraction of $Co_{0.05}Mo_{0.975}S_2$ showed ring diffraction pattern strikingly similar to those visible in the non-stoichiometric MoS1.95 sample (FIG. 4d). This supports the contention that the X-ray line broadening observed in $MoS_{1.95}$ and in the $Co_{0.05}Mo_{0.975}S_2$ sample is mainly due to a lower degree of crystallinity. The close resemblance of the X-ray and electron diffraction patterns of $MoS_{1.95}$ and $Co_{0.05}Mo_{0.975}S_2$ strongly suggest the presence of a nonstoichiometric phase also in the cobalt containing catalyst.

Based on the X-ray diffraction patterns a first estimate of the d-spacings was obtained using silicon as internal standard to analyze the (003) and (101) reflections. The broadening of the other lines made it very difficult to obtain d-spacing values. Compared to the model $MoS_2$ with d-spacings of 6.1122 and 2.7081 for the (003) and (101) lines, values of 6.27081 and 2.7170 were obtained for the $Co_{0.1}Mo_{0.95}S_2$ sample, indicating an expansion of the unit cell.

Samples $Co_{0.5}Mo_{0.75}S_2$ and $Co_{0.6}M_{0.7}S_2$ had more complex X-ray diffraction patterns (FIG. 2), showing the presence of a mixture of $MoS_2$, traces of metallic Mo, and various cobalt sulfides including $Co_3S_4$, $Co_4S_3$, and $CoMo_2S_4$. The sample $Co_{0.5}Mo_{0.75}S_2$ also contained some $CoS_2$. As can be seen from Table 1, the presence of the $Co_xMo_{1-x}S_{2-y}$ phase depends on the cobalt content, as it is observed only in those catalysts with a Co/Mo atomic ratio smaller than 0.5 while the samples $Co_{0.5}Mo_{0.75}S_2$, and $Co_{0.6}Mo_{0.7}S_2$ with Co/Mo ratio $\geq 0.5$ do not exhibit that phase.

The diffraction pattern of sample $Co_{0.2}Mo_{0.9}$ + $H_2S$ (FIG. 2) showed the presence of two phases, metallic Mo inert to the sulfiding treatment under an $H_2S/H_2$ flow at 673K and $Co_9S_8$ which is the thermodynamically stable cobalt sulfide phase.

Based on X-ray diffraction patterns of the used catalysts, given in FIG. 3, $Co_{0.05}Mo_{0.95}S_2$ and $Co_{0.1}Mo_{0.95}S_2$ contained only metallic Mo and the $Co_xMo_{1-x}S_{2-y}$ phase, while $Co_{0.2}Mo_{0.9}S_2$ and $Co_{0.3}Mo_{0.85}S_2$ contained $Co_9S_8$ as well. It seems that under reaction conditions and in presence of higher amounts of cobalt the $CoS_2$ phase is transformed into the thermodynamically stable $Co_9S_8$ phase. These four used catalysts also showed very small traces of cobalt oxide hydroxide. It is highly unlikely that this cobalt oxide hydroxide plays a significant role in the HDS activity. The formation of this cobalt oxide hydroxide is probably due to oxidation of $CoS_2$ during sample transfer to the X-ray machine. The samples of $Co_{0.5}Mo_{0.75}S_2$ and $Co_{0.6}Mo_{0.7}S_2$ consisted of a mixture of $MoS_2$, $Co_9S_8$ and very small amounts of $Co_3S_4$ and $CoMo_2S_4$. Traces of metallic Mo were also detected.

Figure 5:
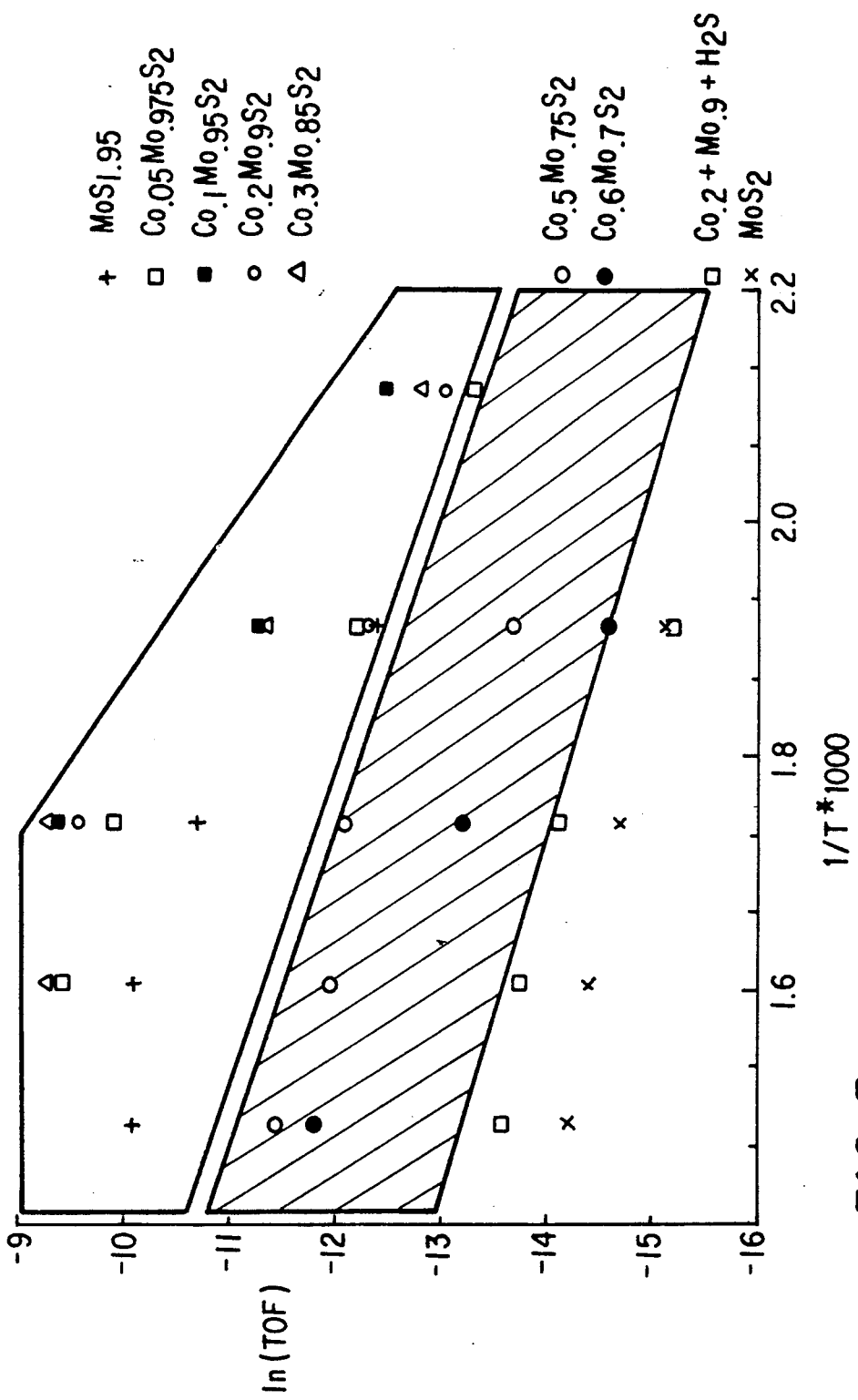
FIG. 5 provides a plot of HDS activity (ln(TOF)) vs 1/T for model catalysts (the turnover frequencies shown are normalized on the basis of thiophene molecules converted per Mo atom in the catalyst per second)
Figure 6:
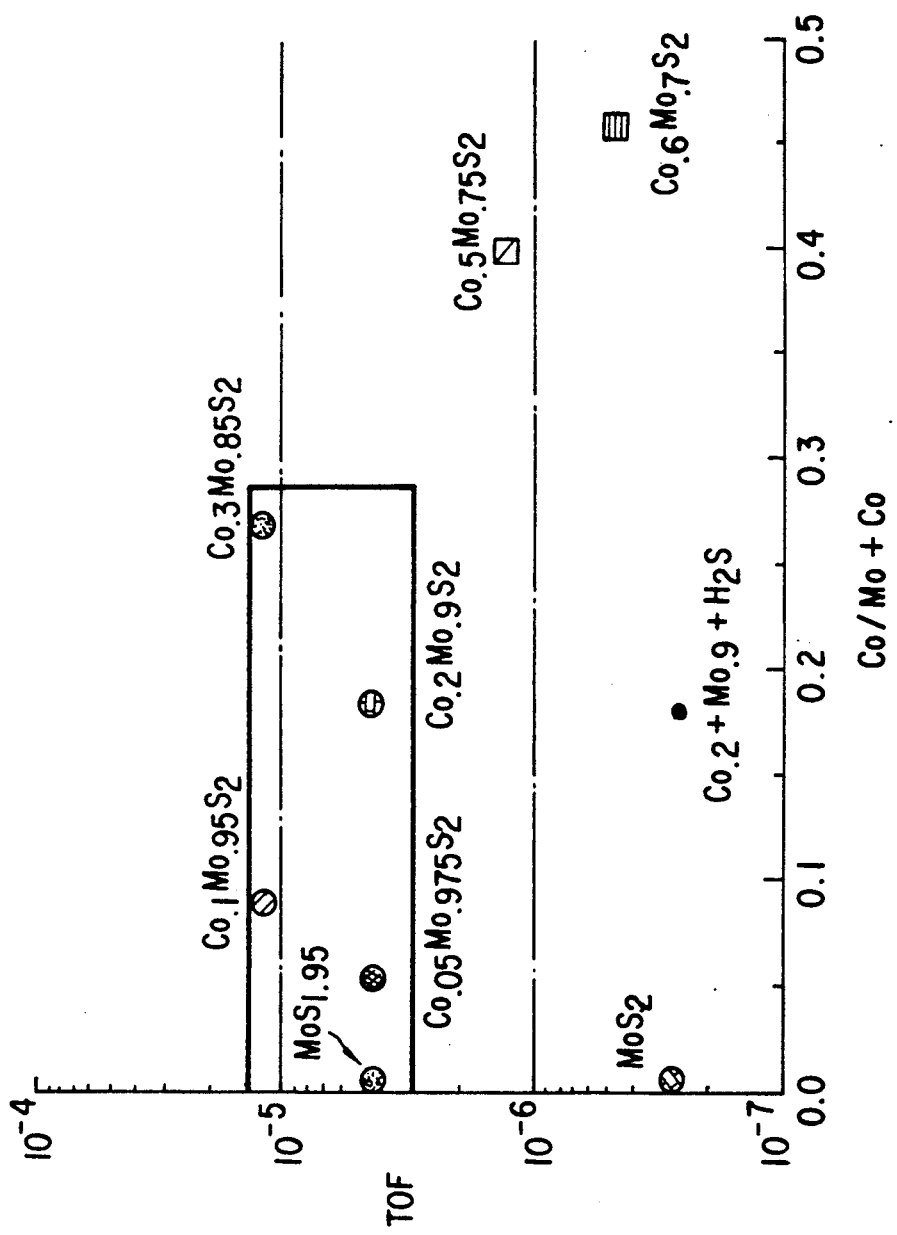
FIG. 6 illustrates thiophene hydrodesulfurization activity at 573K as a function of the Co/Mo ratio in the catalysts.

The temperature dependence of HDS activity of all the model catalysts is presented in FIG. 5. Within the series of $Co_{2x}Mo_{1-x}S_2$ catalysts, $Co_{0.05}Mo_{0.975}S_2$, $Co_{0.1}Mo_{0.95}S_2$, $Co_{0.2}Mo_{0.9}S_2$, $Co_{0.3}Mo_{0.85}S_2$ had significantly higher activities than $Co_{0.5}Mo_{0.75}S_2$ and $Co_{0.6}Mo_{0.7}S_2$. These highly active catalysts containing the non-stoichiometric phase are grouped together in the shaded area on top of the plot, together with the data for the non-stoichiometric $MoS_{1.95}$ sample. The less active Co promoted samples are grouped in the cross-hatched area below, and the physical mixture and $MoS_2$ lie even below this region. To further simplify the comparison between different samples, the activity at 573K is plotted as a function of the Co/Mo ratio (FIG. 6).

High HDS activity of the Co containing catalysts coincided with the observation of X-ray and electron diffraction patterns indicative of the nonstoichiometric phase (FIGS. 1, 2, 5 and 6) resembling the one found in $MoS_{1.95}$. The less active samples $Co_{0.5}Mo_{0.75}S_2$, $Co_{0.6}Mo_{0.7}S_2$, $Co_{0.2}Mo_{0.9}$ + $H_2S$ and the stoichiometric $MoS_2$ sample did not contain detectable amounts of the nonstoichiometric phase.

The Co promoting effect appears to be linked to the sulfur vacancies created to maintain the charge balance during the partial replacement of Mo ions in the $MoS_2$ lattice by lower charged Co ions. However, it should be noted that a significant activity enhancement can be achieved in absence of cobalt by directly introducing anionic sulfur vacancies into $MoS_2$ (see the activity data for sample $MoS_{1.95}$ in FIGS. 5 and 6). Of course, this does not rule out that cobalt has an additional promoting role beyond the effect of creating non-stoichiometry in molybdenum sulfide. XPS confirmed that the $MoS_{1.95}$ sample contained only molybdenum and sulfur with small amounts of carbon and oxygen. The XPS spectra for the Co containing catalysts were similar in appearance except for the presence of well resolved Co $2p_{\frac{1}{2}}$ and Co $2p_{3/2}$ peaks.

The samples with very high activity had also much greater surface area than the samples with lower activities. However, a normalization of activity based on surface area would not be meaningful in view of the well known lack of correlation between HDS activity and surface area. Our results corroborate this lack of correlation. Samples with nearly identical surface areas have almost an order of magnitude difference in activity (see FIGS. 5 and 6, and Table 1).

Figure 7:
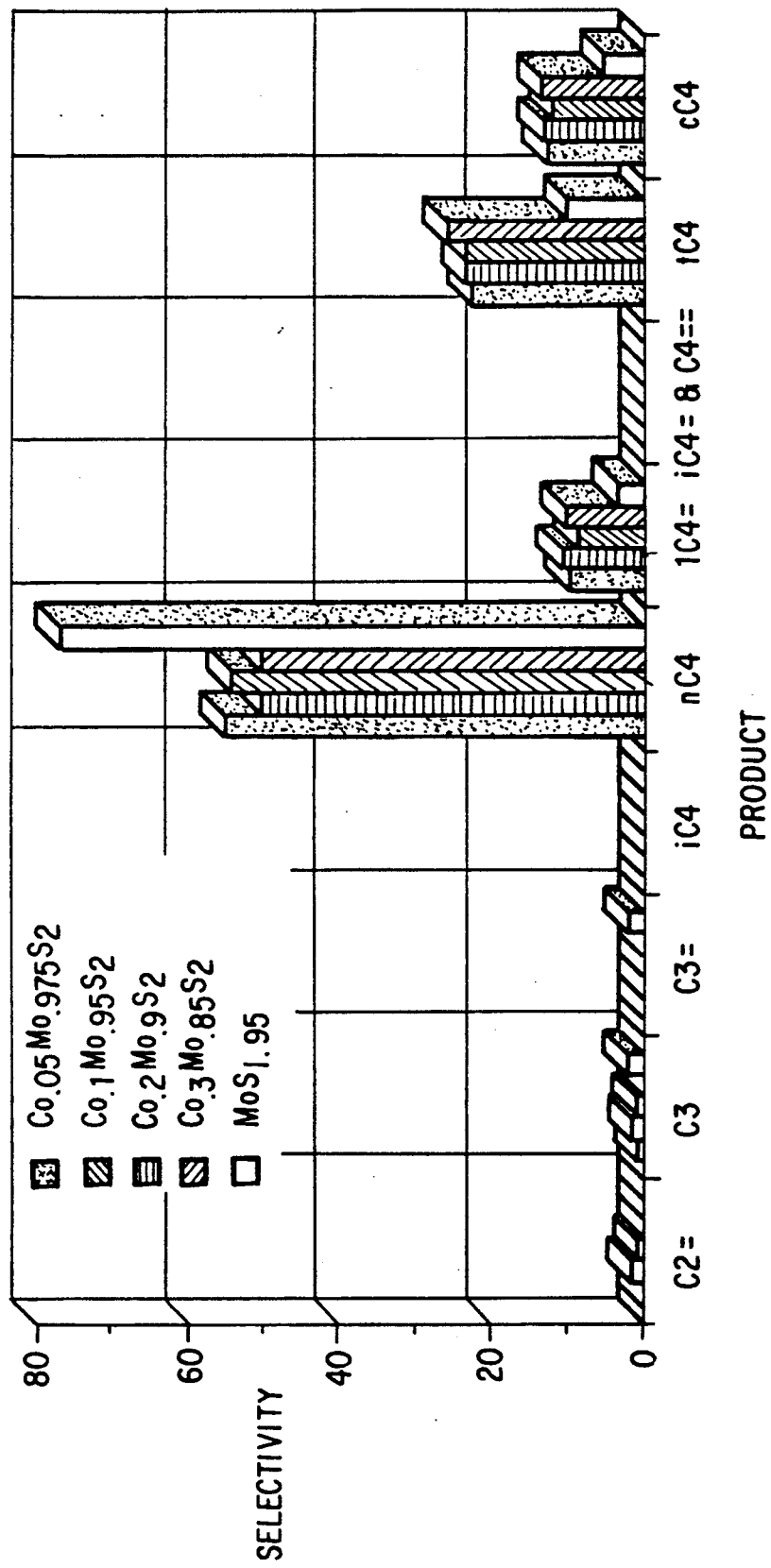
FIG. 7 illustrates selectivity for $C_2$, $C_3$, and $C_4$ hydrocarbon product formation in thiophene hydrodesulfurization over $Co_{0.05}Mo_{0.975}S_2$, $Co_{0.1}Mo_{0.95}S_2$, $Co_{0.2}Mo_{0.9}S_2$, $Co_{0.3}Mo_{0.85}S_2$ model catalysts at 523K (the turnover frequencies obtained at this temperature were between $4 \times 10^{-6}$ and $1.2 \times 10^{-5}$ s$^{-1}$)
Figure 8:
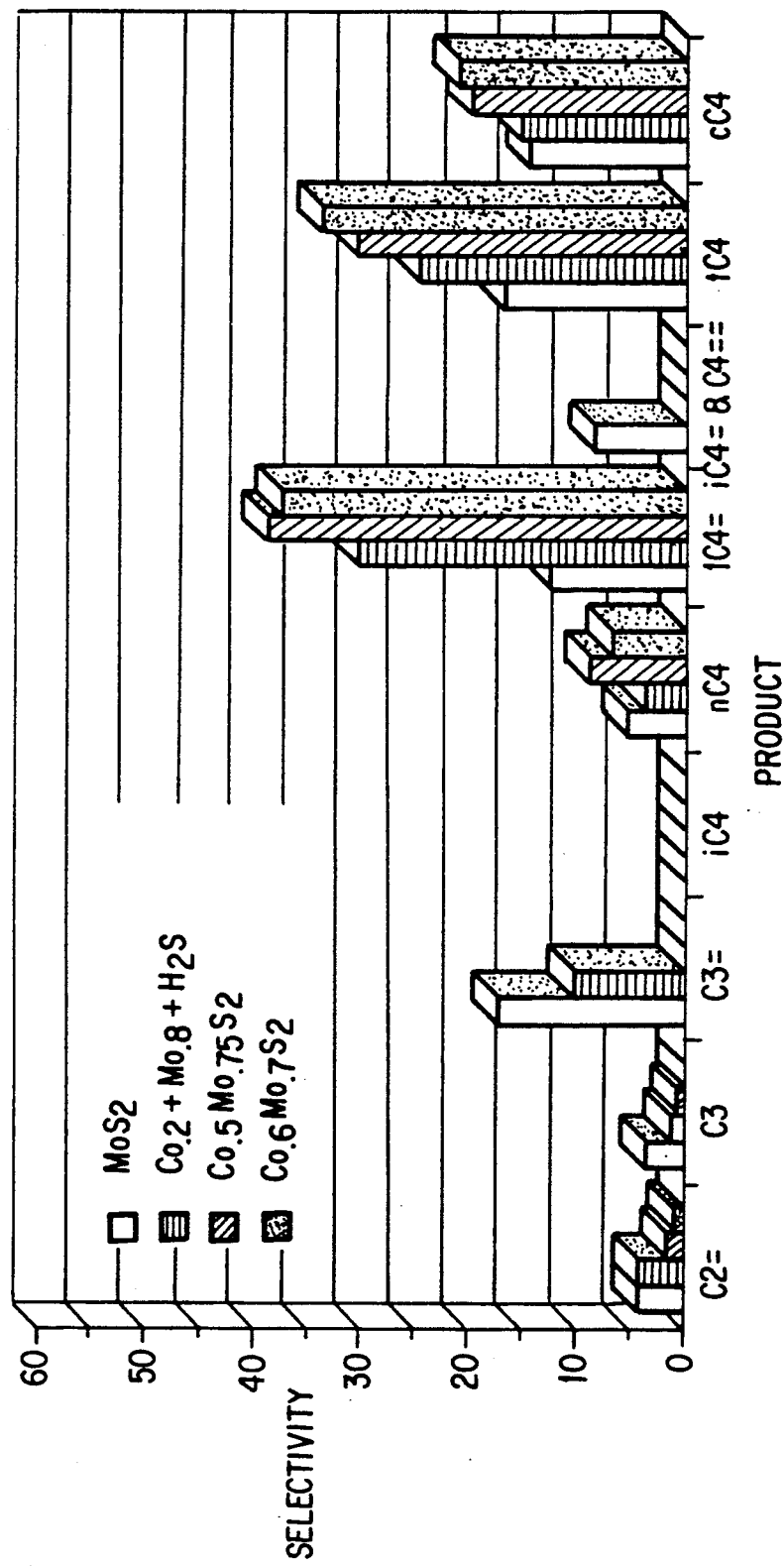
FIG. 8 illustrates selectivity for $C_2$, $C_3$, and $C_4$ hydrocarbon product formation in thiophene hydrodesulfurization over catalysts $Co_{0.5}Mo_{0.75}S_2$, $Co_{0.6}Mo_{0.7}S_2$, '$Co_{0.2}Mo_{0.9}$ + $H_2S$', and $MoS_2$ at 623K (the turnover frequencies obtained at this temperature were between $5.44 \times 10^{-7}$ and $6.32 \times 10^{-6}$ s$^{-1}$).

The product distributions of different hydrocarbons resulting from the hydrosulfurization of thiophene are given in FIGS. 7 and 8. All data shown in these two figures were collected within a narrow range of turnover frequencies at comparable levels of conversion. Isobutene and butadiene could not be separated under our experimental conditions and FIGS. 7 and 8 show the sum of these two products.

Large differences in product distributions were observed between the different groups of catalysts. $MoS_2$ and the mechanical mixture $Co_{0.2}Mo_{0.9}$ + $H_2S$ showed similar behavior, except for the lack of isobutene and butadiene in the product spectrum obtained over the mechanical mixture. Instead, the mechanical mixture gave a higher amount of 1-butene (FIG. 8). Under comparable reaction conditions, the catalyst samples $Co_{0.5}Mo_{0.75}S_2$ and $Co_{0.6}Mo_{0.7}S_2$ did not produce any propene and showed slightly higher selectivity for 1-butene, and trans- and cis-butene. Isobutylene or butadiene was formed only over $MoS_2$, but not over any of the other catalysts.

The product distributions for the four highly active samples with lower Mo/Co ratios (FIG. 7) show a total absence of propene reminiscent of the results obtained on the two samples $Co_{0.5}Mo_{0.75}S_2$ and $Co_{0.6}Mo_{0.7}S_2$. Furthermore, on all four of these catalysts n-butane is the main reaction product with more than 500% selectivity. The increase in n-butane selectivity is accomplished largely at the expense 1-butene. It is reasonable to assume that the presence of metallic Mo increased the hydrogen transfer capability in samples $Co_{0.05}Mo_{0.975}S_2$ through $Co_{0.3}Mo_{0.85}S_2$ resulting in enhanced formation of saturated n-butane. The non-stoichiometric $MoS_{1.95}$ sample had even higher selectivity for n-butane due to the presence of significant amounts of unreacted metallic molybdenum.

WORKING EXAMPLES

EXAMPLE 1

A stoichiometric mixture of $Co_{0.05}Mo_{0.975}S_2$ was heated to 510° C. ($\pm$10° C.) for 24 hrs under vacuum. The resulting material was a dark gray powder with a surface area of 26 $m^2 g^{-1}$. X-ray diffraction confirmed the presence of the following crystalline phases in the material: metallic molybdenum, non-stoichiometric $MoS_2$, and $CoS_2$ in the pyrite-type structure.

This material (0.35 g) was loaded into a stainless steel flow reactor which was subsequently flushed with helium gas. The temperature of the reactor was raised to 400° C. under flowing helium gas for about 1 hr. Then, the helium flow was stopped and the temperature lowered to the one desired for hydrodesulfurization catalysis of thiophene (typically in the range of 200 to 400° C.). A gaseous feedstream containing 2.7% thiophene and the balance being hydrogen with a flow rate of 10 ml (STP)/min of hydrogen was admitted to the reactor at a pressure of 14.3 psia. The effluent from the reactor was periodically analyzed by gas chromatography.

At a temperature of 200° C., a thiophene conversion of 7% was achieved. The product spectrum contained small amounts (<1%) of ethane and ethylene, about 1% of propane, 1% of propylene, 3% n-butane, 5% 1-butene, 40% trans-butene, 17% cis-butene, 30% butadiene.

At higher temperatures, the conversion of thiophene increased rapidly, reaching 100% at 350° C. At high conversions, n-butane became the major hydrocarbon product (about 46% of the products), with 10% 1-butene, 24% trans-butene, and 17% cis-butene. The rest of the products consisted of small amounts (<1%) of propane and ethane. No ethylene and propylene were formed.

After use in hydrodesulfurization, the powder was characterized again by X-ray diffraction. It contained nonstoichiometric $MoS_2$, $Co_9S_8$, and metallic Mo.

EXAMPLE 2

A stoichiometric mixture of $Co_{0.1}Mo_{0.95}S_2$ was heated to 510° C. (±10° C.) for 24 hrs under vacuum. The resulting material was a dark gray powder with a surface area of 14 $m^2 g^{-1}$. X-ray diffraction confirmed the presence of the following crystalline phases in the material; metallic molybdenum, nonstoichiometric $MoS_2$, and $CoS_2$ in the pyrite-type structure.

This material (0.35 g) was loaded into a stainless steel flow reactor which was subsequently flushed with helium gas. The temperature of the reactor was raised to 400° C. under flowing helium gas for about 1 hr. Then, the helium flow was stopped and the temperature lowered to the one desired for hydrodesulfurization catalysis of thiophene (typically in the range of 200 to 400° C.). A gaseous feedstream containing 2.7% thiophene and the balance being hydrogen with a flowrate of 10 ml (STP)/min of hydrogen was admitted to the reactor at a pressure of 14.3 psia. The effluent from the reactor was periodically analyzed by gas chromatography.

At a temperature of 200° C., a thiophene conversion of 10% was achieved the product spectrum contained no ethane or ethylene, about 1% of propane, no propylene, 9% n-butane, 8% 1-butene, 45% trans-butene, 37% cisbutene, and no butadiene. Even at higher temperatures up to 400° C., no butadiene production was observed. At 250° C., the thiophene conversion reached 25 to 30% with increasing hydrogenation of unsaturated $C_4$ products to n-butane. At 300° C., the thiophene conversion reached 100% with n-butane representing about 50% of the hydrocarbon products. At 200° C., the product distribution showed some variation with time on stream, while at 400° C. the product spectrum remained essentially unchanged with time. A comparison of the product distributions as a functions of time on stream obtained at 200° C. and 400° C. is given in FIG. 1.

After use in hydrodesulfurization, the powder was characterized again by X-ray diffraction. It contained nonstoichiometric $MoS_2$, $Co_9S_8$, and metallic Mo.

EXAMPLE 3

A stoichiometric mixture of $Co_{0.2}Mo_{0.9}S_2$ was heated to 510° C. (±10° C.) for 24 hrs under vacuum. The resulting material was a dark gray powder with a surface area of 14 $m^2 g^{-1}$. X-ray diffraction confirmed the presence of the following crystalline phases in the material: metallic molybdenum, nonstoichiometric $MoS_2$ and $CoS_2$ in the pyrite-type structure.

This material (0.35 g) was loaded into a stainless steel flow reactor which was subsequently flushed with helium gas. The temperature of the reactor was raised to 400° C. under flowing helium gas for about 1 hr. Then, the helium flow was stopped and the temperature lowered to the one desired for hydrodesulfurization catalysis of thiophene (typically in the range of 200 to 400° C.). A gaseous feedstream containing 2.7% thiophene and the balance being hydrogen with a flowrate of 10 ml (STP)/min of hydrogen was admitted to the reactor qt a pressure of 14.3 psia. The effluent from the reactor was periodically analyzed by gas chromatography.

At a temperature of 300° C., a thiophene conversion of about 82% was achieved. The product spectrum contained 0.2% of ethane, no ethylene, about 0.2% of propane, no propylene, 33% n-butane, 13% 1-butene, 31% trans-butene, 21% cis butene, and no butadiene. At 400° C., the thiophene conversion reached 100%. A comparison of the product distributions as a function of time on stream obtained at 200° C. and 400° C. is given in FIG. 2. At 200° C., the product distribution fluctuate with time on stream, while stable steady state performance was achieved at 400° C.

After use in hydrodesulfurization, the powder was characterized again by X-ray diffraction. It contained nonstoichiometric $MoS_2$, $Co_9S_8$, and metallic Mo.

EXAMPLE 4

A stoichiometric mixture of $Co_{0.3}Mo_{0.85}S_2$ is heated to 510° C. (±10° C.) for 24 hrs under vacuum. The resulting material was a dark gray powder with a surface area of 15 $m^2 g^{-1}$. X-ray diffraction confirmed the presence of the following crystalline phases in the material: metallic molybdenum, nonstoichiometric $MoS_2$ and $CoS_2$ in the pyrite-type structure.

This material (0.35 g) was loaded into a stainless steel flow reactor which was subsequently flushed with helium gas. The temperature of the reactor was raised to 400° C. under flowing helium gas for about 1 hr. Then, the helium flow was stopped and the temperature lowered to the one desired for hydrodesulfurization catalysis of thiophene (typically in the range of 200 to 400° C.). A gaseous feedstream containing 2.7% thiophene and the balance being hydrogen with a flowrate of 10 ml (STP)/min of hydrogen was admitted to the reactor at a pressure of 14.3 psia. The effluent from the reactor was periodically analyzed by gas chromatography.

At a temperature of 200° C., the thiophene conversion fluctuated with time on stream, ranging from 3% to 33%. Trans-butene was the major product. At 250° C., the thiophene conversion reached 25%. The product spectrum contained no ethane or ethylene, a small trace of propane, no propylene, 24% n-butane, 14% 1-butene, 37% trans-butene, 25% cis-butene, and no butadiene. At 300° C., the thiophene conversion reached 100% with n-butane representing about 50% of the hydrocarbon products.

After use in hydrodesulfurization, the powder was characterized again by X-ray diffraction. It contained nonstoichiometric $MoS_2$, $Co_9S_8$, and metallic Mo.

EXAMPLE 5

Powder mixtures with the overall stoichiometries of $Co_{0.5}Mo_{0.75}S_2$ and $Co_{0.6}Mo_{0.7}S_2$ were heated to 510° C. (±10° C.) for 24 hrs under vacuum. The resulting materials were hard masses containing dark gray or black crystalline particles fused together. After grinding them into powders, the materials had surface areas of less than 1 m² g⁻¹. The material contained mixtures of cobalt sulfide and molybdenum sulfide. No unreacted molybdenum was found.

This material (0.35 g) was loaded into a stainless steel flow reactor which was subsequently flushed with helium gas. The temperature of the reactor was raised to 400° C. under flowing helium gas for about 1 hr. Then, the helium flow was stopped and the temperature lowered to the one desired for hydrodesulfurization catalysis of thiophene (typically in the range of 200 to 400° C.). A gaseous feedstream containing 2.7% thiophene and the balance being hydrogen with a flowrate of 10 ml (STP)/min of hydrogen was admitted to the reactor qt a pressure of 14.3 psia. The effluent from the reactor was periodically analyzed by gas chromatography. The materials had poor catalytic activity with overall conversions of thiophene <30% even at 400° C. At 200° C., butadiene was the main product. At 400° C., no butadiene was found in the products. Instead, 1-butene, trans-butene and cisbutene in approximately equal amounts of 30% each were found.

EXAMPLE 6

Stoichiometric mixtures of $Fe_{2x}Mo_{1-x}S_2$ with x=0.025, 0.05, 0.1, 0.2, 0.25, 0.3 were heated to 510° C. (±10° C.) for 24 hrs under vacuum. The resulting materials were dark gray powders with surface areas of 15–20 m² g⁻¹ for x=0.025 and 0.2. For samples with x=0.25 and 0.3, the surface areas were 6 m² g⁻¹. X-ray diffraction confirmed the presence of the following crystalline phases in the material: metallic molybdenum, nonstoichiometric $MoS_2$, and $FeS_2$ in the pyrite-type structure.

This material (0.35 g) was loaded into a stainless steel flow reactor which was subsequently flushed with helium gas. The temperature of the reactor was raised to 400° C. under flowing helium gas for about 1 hr. Then, the helium flow was stopped and the temperature lowered to the one desired for hydrodesulfurization catalysis of thiophene (typically in the range of 200 to 400° C.). A gaseous feedstream containing 2.7% thiophene and the balance being hydrogen with a flowrate of 10 ml (STP)/min of hydrogen was admitted to the reactor at a pressure of 14.3 psia. The effluent from the reactor was periodically analyzed by gas chromatography.

The catalytic behavior of the materials in hydrodesulfurization was similar to that shown in the previous examples of MoCo catalysts except for the appearance of significant amounts of mercaptans with increasing Fe content.

After reaction, the materials were characterized by X-ray diffraction. They contain metallic molybdenum, nonstoichiometric $MoS_2$, and $Fe_{1-x}S$, an iron sulfide phase also known as pyrrhotite.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A composition comprising a support and a catalyst having an overall stoichiometry of $M_{2x}A_{1-x}S_2$ wherein $0.001 \leq X \leq 0.5$, and wherein M is at least one member selected from the group consisting of Co, Fe, Ni, Cu, Zn, Mn and Ru, and A is either Mo or W, wherein said catalyst is obtained by (i) mixing elemental M, elemental A and elemental S, in a relative amount of x moles of M and (1-x)/2 moles of A per mole of S, and (ii) heating the mixture, in the absence of oxygen, to a temperature of from 200° C. to 800° C.
2. The composition of claim 1, wherein M is Co.
3. The composition of claim 1, wherein M is Fe.
4. The composition of claim 1, wherein M is Ni.
5. The composition of claim 1, wherein M is Cu.
6. The composition of claim 1, wherein M is Zn.
7. The composition of claim 1, wherein M is Mn.
8. The composition of claim 1, wherein M is Ru.
9. The composition of claim 1, wherein A is Mo.
10. The composition of claim 1, wherein A is W.
11. The composition of claim 1, wherein said catalyst is embedded in a matrix material of ceramic, as said support.
12. The composition of claim 1, wherein said catalyst is embedded in a matrix material of $Al_2O_3$, MgO, $SiO_2$, $TiO_2$, carbon, zeolite, or diatomaceous earth, as said support.
13. A catalyst having an overall stoichiometry of $M_{2x}A_{1-x}S_2$, wherein $0.001 \leq X \leq 0.5$, wherein M is at least one member selected from the group consisting of Co, Fe, Ni, Cu, Zn, Mn and Ru, and wherein A is either Mo or W, wherein said catalyst is obtained by (i) mixing elemental M, elemental A and elemental S, in a relative amount of x moles of M and (1-x)/2 moles of A per mole of S, and (ii) heating the mixture, in the absence of oxygen, to a temperature of from 200° C. to 800° C.
14. The catalyst of claim 13, wherein M is Co.
15. The catalyst of claim 13, wherein M is Fe.
16. The catalyst of claim 13, wherein M is Ni.
17. The catalyst of claim 13, wherein M is Cu.
18. The catalyst of claim 13, wherein M is Zn.
19. The catalyst of claim 13, wherein M is Mn.
20. The catalyst of claim 13, wherein M is Ru.
21. The catalyst of claim 13, wherein A is Mo.
22. The catalyst of claim 13, wherein A is W.
23. A composition comprising a support and a catalyst having an overall stoichiometry of $AS_{2-y}$, wherein A is Mo or W, and wherein $0.01 \leq y \leq 1.0$, obtained by (i) mixing elemental A and elemental S in a relative amount of (2-y) moles of S per mole of A, and (ii) heating the mixture, in the absence of oxygen, to a temperature of from 200° C. to 800° C.
24. A catalyst having an overall stoichiometry of $AS_{2-y}$, wherein A is Mo or W, and wherein $0.01 \leq y \leq 1.0$, obtained by (i) mixing elemental A and elemental S in a relative amount of (2-y) moles of S per mole of A, and (ii) heating the mixture, in the absence of oxygen, to a temperature of from 200° C. to about 800° C.

* * * * *